(12) United States Patent
Paskowitz

(10) Patent No.: US 6,377,937 B1
(45) Date of Patent: Apr. 23, 2002

(54) METHOD AND SYSTEM FOR MORE EFFECTIVE COMMUNICATION OF CHARACTERISTICS DATA FOR PRODUCTS AND SERVICES

(75) Inventor: Selwyn Sid Paskowitz, McLean, VA (US)

(73) Assignee: Paskowitz Associates, McLean, VA (US)

( * ) Notice: Subject to any disclaimer, the term of this patent is extended or adjusted under 35 U.S.C. 154(b) by 0 days.

(21) Appl. No.: 09/084,979

(22) Filed: May 28, 1998

(51) Int. Cl.[7] .............................................. G06F 17/60
(52) U.S. Cl. ...................................................... 705/26
(58) Field of Search ........................... 705/26, 27; 704/4

(56) References Cited

U.S. PATENT DOCUMENTS

| | | | |
|---|---|---|---|
| 4,318,184 A | | 3/1982 | Millett et al. |
| 4,408,273 A | | 10/1983 | Plow |
| 4,734,858 A | * | 3/1988 | Schlafly ........................ 705/26 |
| 4,847,761 A | | 7/1989 | Ferriter et al. |
| 4,931,929 A | | 6/1990 | Sherman |
| 4,945,475 A | | 7/1990 | Bruffey et al. |
| 4,984,155 A | * | 1/1991 | Geier et al. .................... 705/26 |
| 5,307,261 A | | 4/1994 | Maki et al. |
| 5,361,199 A | * | 11/1994 | Shoquist et al. ............... 705/26 |
| 5,475,585 A | * | 12/1995 | Bush ............................ 705/26 |
| 5,499,366 A | | 3/1996 | Rosenberg et al. |
| 5,515,268 A | * | 5/1996 | Yoda ............................. 705/26 |
| 5,515,269 A | | 5/1996 | Willis et al. |
| 5,528,490 A | * | 6/1996 | Hill ............................. 395/712 |
| 5,544,040 A | * | 8/1996 | Gerbaulet ..................... 705/26 |
| 5,557,518 A | | 9/1996 | Rosen |
| 5,560,006 A | | 9/1996 | Layden et al. |
| 5,590,197 A | * | 12/1996 | Chen et al. .................... 380/24 |
| 5,621,797 A | | 4/1997 | Rosen |
| 5,625,798 A | | 4/1997 | Badders |
| 5,642,419 A | | 6/1997 | Rosen |
| 5,642,522 A | | 6/1997 | Zaenen et al. |
| 5,644,776 A | | 7/1997 | DeRose et al. |
| 5,659,723 A | | 8/1997 | Dimitrios et al. |
| 5,664,110 A | | 9/1997 | Green et al. |
| 5,671,279 A | | 9/1997 | Elgamal |
| 5,675,784 A | | 10/1997 | Maxwell et al. |
| 5,675,806 A | | 10/1997 | Takada et al. |
| 5,694,523 A | | 12/1997 | Wical |
| 5,701,462 A | | 12/1997 | Whitney et al. |
| 5,703,949 A | | 12/1997 | Rosen |
| 5,706,405 A | | 1/1998 | Short et al. |
| 5,710,887 A | | 1/1998 | Chelliah et al. |
| 5,715,314 A | | 2/1998 | Payne et al. |

(List continued on next page.)

FOREIGN PATENT DOCUMENTS

| WO | WO 97/03423 | 1/1997 |
|---|---|---|
| WO | WO 97/19414 | 5/1997 |
| WO | WO 97/26612 | 7/1997 |

OTHER PUBLICATIONS

Microsoft Computers Dictionary (3rd Gd).*

*Primary Examiner*—Frantzy Poinvil
*Assistant Examiner*—Geoffrey Akers
(74) *Attorney, Agent, or Firm*—Miles & Stockbridge, PC

(57) ABSTRACT

A taxonomy of characteristics for products and services is linked via indexing keys to a companion dictionary of terms and to electronic files containing characteristics data on offered products and services. The taxonomy is structured into domains of form, fit, function, and administrative data and permits identification of products and services that can be independent of prior knowledge of the type of product or service or the source of the product or service. In operation, a system user selects required characteristics from the taxonomy and sets values of the fundamental units of measure or identification for each selected characteristic. The system uses the associated indexing keys to locate and display a plurality of available products and services that satisfy those requirements.

10 Claims, 5 Drawing Sheets

U.S. PATENT DOCUMENTS

| | | |
|---|---|---|
| 5,715,402 A | 2/1998 | Popolo |
| 5,717,925 A | 2/1998 | Harper et al. |
| 5,721,832 A | 2/1998 | Westrope et al. |
| 5,721,911 A | 2/1998 | Ha et al. |
| 5,724,424 A | 3/1998 | Gifford |
| 5,724,512 A | 3/1998 | Winterbottom |
| 5,724,577 A | 3/1998 | Exley et al. |
| 5,734,719 A | 3/1998 | Tsevdos et al. |
| 5,913,210 A * | 6/1999 | Call .............................. 707/4 |
| 5,918,214 A * | 6/1999 | Perkowski ................... 705/27 |
| 6,009,413 A * | 12/1999 | Webber et al. ............... 705/26 |
| 6,026,376 A * | 2/2000 | Kenney ....................... 705/27 |
| 6,058,373 A * | 5/2000 | Blinn et al. .................. 705/26 |
| 6,064,979 A * | 5/2000 | Perkowski ................... 705/26 |
| 6,070,149 A * | 5/2000 | Tavor et al. ................. 705/26 |

\* cited by examiner

METHOD AND SYSTEM FOR MORE EFFECTIVE COMMUNICATION OF CHARACTERISTICS DATA FOR PRODUCTS AND SERVICES

BACKGROUND OF THE INVENTION

1. Field of the Invention

This invention generally relates to retrieving information from electronic files, and more particularly to a method of searching for information in one or more of a plurality of electronic files interconnected by a computer or a network to, for example, engage in the pursuit of commerce for desired products and services.

2. Description of the Related Art

FIG. 1 is a flow diagram showing a conventional process implemented by buyers for locating products and services. According to this process, a buyer, first, identifies a product or service of interest and, then, looks for that product or service, and/or its seller, using one or a number of resources. The buyer, for example, may visit the seller's place of business to gain information about the products or services he is offering. Before, or in lieu of a physical visit, the buyer may consult one or more textual resources, including catalogs, standards, specifications, product data sheets, and Internet web sites. The buyer may also use a number of communications tools to assist him in obtaining information, including the telephone, facsimile machines, e-mail resources, and Internet web-site services and search engines. Through these efforts and resources, the buyer is able to amass a collection of information regarding some of the products and services being offered for sale in the marketplace. The buyer may then select from the collection the product or service which he believes best suits his needs.

Efforts have been made to improve upon the conventional process of searching for information on products and services. For example, electronic commerce, such as that conducted on the Internet and sometimes known as Internet Commerce, has proven to be more effective than the conventional process for locating desired products and services. These systems, however, also have a number of significant drawbacks:

Inefficient Searches. Known methods of conducting electronic commerce require the buyer to use an electronic catalog, or require him to electronically walk through a store, to find the desired products and services. This causes the buyer to look at only one item at a time and from only one source at a time. Comparisons with other products or services or with other sources are time-consuming, and may not be cost-effective for the buyer. Regional listings, such as Thomas Register, and industry specific sources do not allow identification of acceptable products that may appear in non-traditional sourcing files.

Limited Searches. Known methods of conducting electronic commerce, can search for products or services only from companies in electronic catalogs, and the buyer's options are further limited because he will receive information for only those products and services which those companies sell, which may not necessarily be all the products and services in existence, the best ones to suit the buyer's needs, or the ones having the lowest price.

Lowest Price Information Unavailable. Because sellers tend to push only those products and services having the greatest sales incentives, information on other products and services being offered for sale by sellers may not be readily available. Unwary buyers, therefore, often end up paying more for products and services. Also, in this regard, known methods are flawed because there is no single resource available which consistently provides lowest price information for products and services offered by sellers, including those which the sellers may not be currently pushing.

Confusion. Sellers sometimes replace or modify original equipment manufacturer's parts numbers to confuse buyers, such as embedding dashes or adding prefixes or suffixes. Known methods for conducting electronic commerce cannot differentiate between the original and modified parts numbers, and thus will not prevent this confusion.

Packaging Differences. Seller often offer different packaging schemes for the same product, e.g., the product may come in different sizes as by the box, spool, gallon, drum, etc. Known methods of electronic commerce offer no way of differentiating between these differently packaged items. As a result, buyers often fail to find alternative packaging for the products they desire. Examples include resistors and lubricants.

Total Cost to Buyer. Different areas of catalogs have cost structures for discounts, shipping, handling and taxes, thereby making side-by-side cost comparisons difficult and labor intensive. Buyers usually seek a shopping list of products and services and need a decision support tool to automatically calculate all the factors that result in the bottom line cost for delivery of the products and services on the shopping list, not just the published prices for the individual items. Known methods for conducting electronic commerce cannot meet this need.

Delivery Time. Problems similar to those of total cost to the buyer apply for item availability, and in determining expected time from order until receipt for items on a shopping list. Known methods fail to adequately address these concerns.

In addition, or in conjunction with electronic commerce, international standards (e.g., ISO 13584, Parts Library) have been developed as a resource for providing information on product families. However, use of coding schemes from those standards results in searches of limited effectiveness, i.e., only products in the cited family can be located.

From the foregoing discussion, it is therefore clear that a need exists for a method of conducting electronic commerce and communicating characteristics data which overcomes at least the aforementioned drawbacks of the conventional methods described above.

SUMMARY OF THE INVENTION

It is an object of the present invention to provide a computer-implemented method of conducting electronic commerce which is faster, more efficient, and more effective than conventional methods for locating products and services.

It is another object of the present invention to provide a computer-implemented method which simultaneously searches for and collects in a central location information on a plurality of products and services offered by different sellers/manufacturers.

It is another object of the present invention to provide a computer-implemented method which locates products and services to meet a buyer's needs without requiring the buyer to have a foreknowledge of the nature and type of those products and services, or their sellers and manufacturers.

It is another object of the present invention to achieve the aforementioned object by providing a computer-implemented method which locates product/service information to meet a buyer's needs by only requiring the buyer to identify one or more characteristics of the product or service for which he is looking and then to allow a characteristics-taxonomy-driven model to automatically locate information on products/services and their sellers which match those characteristics.

The foregoing and other objects of the invention are achieved by providing a computer-implemented method for effectively communicating characteristics data for products and services, which method includes forming a taxonomy model of characteristics for products and services linked via indexing keys to a companion dictionary of terms and to electronic sourcing files containing characteristics data on offered (or available) products and services. The characteristics taxonomy is structured into four domains of form, fit, function, and administrative data, and permits identification of products and services that can be located without the system user knowing the type of product or service or the source of the product or service.

In one embodiment, a buyer specifies characteristics of a product or service from the taxonomy model and establishes required values of the fundamental units of measure or other identifying information for one or more of the specified characteristics. The system uses the associated indexing keys to locate and display a plurality of available products and services which satisfy those requirements. The displayed products and services can be immediately available from proximate inventory as well as nationally or internationally available via the Internet. Criteria for expanding or narrowing the search are selected by the user.

DESCRIPTION OF THE PREFERRED EMBODIMENTS

The present invention is a method of locating information in electronic files, or in a plurality of electronic files which, for example, may be interconnected by and made accessible through a computer network. For purposes of the present description, the term "electronic file" may be deemed to be synonymous with either one electronic file or a plurality of interconnected electronic files, such as may be found available on the Internet.

A first embodiment of the method of the present invention is especially well-suited for conducting electronic commerce on the Internet, but one skilled in the art can appreciate that this embodiment may be adapted to search for information in electronic files of any type. For this embodiment, the following definitions obtain:

Descriptive Data—data characterizing an existing product or service. Characteristics include dimensions, color, function, reliability, material content, delivery schedule and price. These data are cited by a producer or seller of a product or service.

Design Requirement or Design Intent—a specification of crucial characteristics and values applicable to a physical location of an item in the design of a component or product, or crucial characteristics and values that define a user's need.

Prescriptive Data—data defining specific characteristics and values crucial to the form, fit, function, or administrative data requirements for a product or service. For example, two identical resistors might be included in two different locations in the design and manufacture of a TV set. They are identical because their descriptive data are identical. However, the engineering design requirements of the two locations may have prescribed the tolerance of one location as more constrained than the other. For purposes of part commonality and standardization, identical parts that satisfied the more restrictive constraint might have been used in both locations and included in the bill of materials. Replacement parts could be sourced at lower cost and better availability using prescriptive data with cost and availability constraints, rather than the descriptive data and the use of commonality and standardization as constraints.

Figure 1:
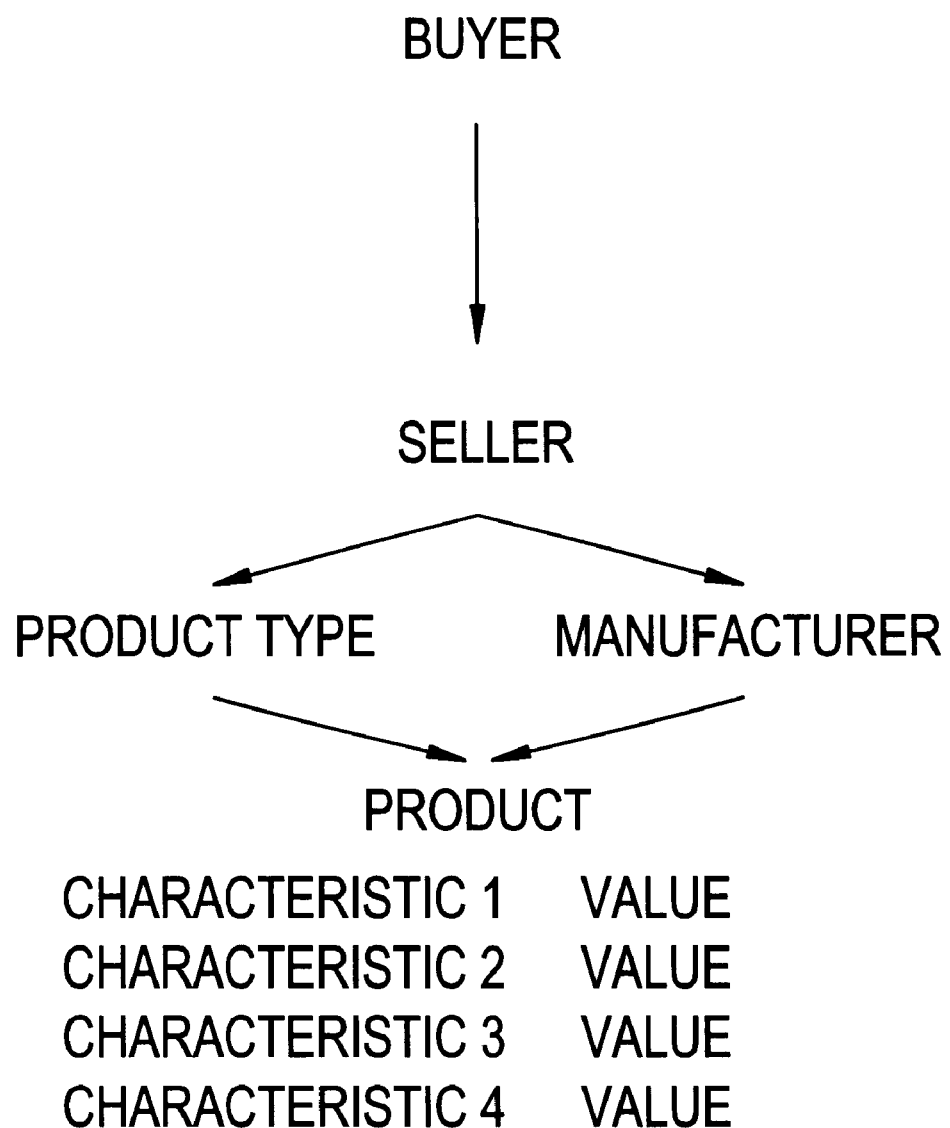
FIG. 1 is a flow diagram showing a conventional process used by a buyer in sourcing desired products or services.
Figure 2:
FIG. 2 is a flow diagram showing steps included in a first embodiment of the method of the present invention.
Figure 5:
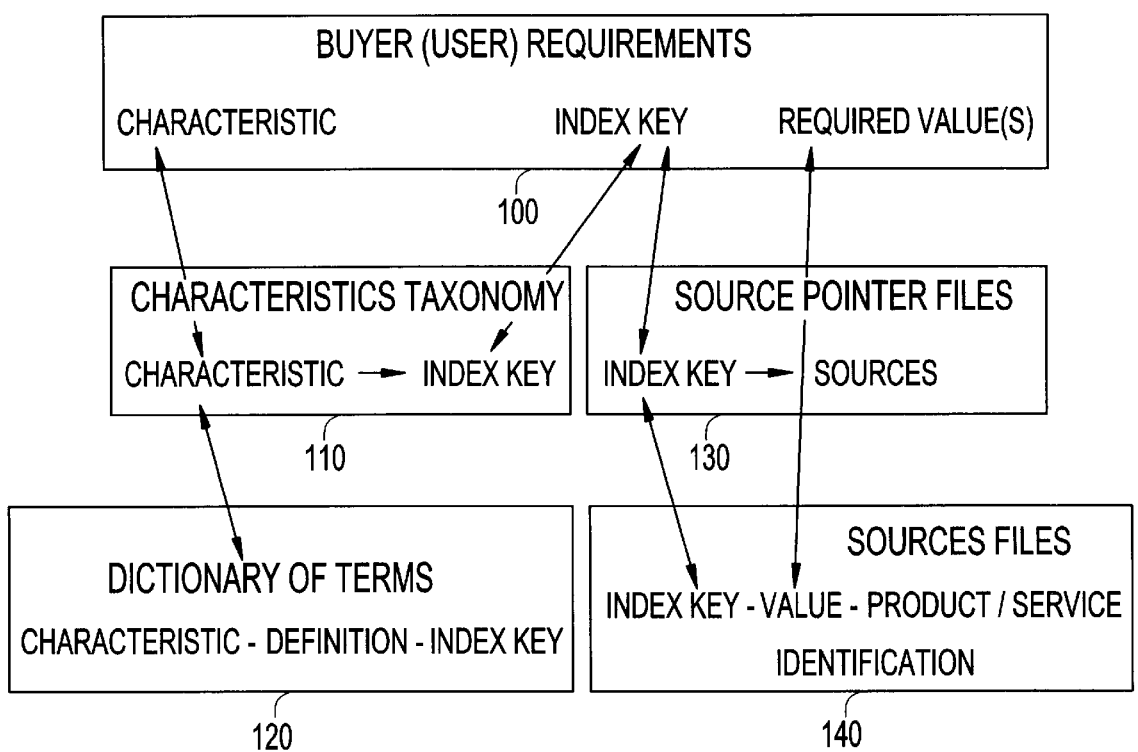
FIG. 5 is a conceptual diagram showing application of steps included in the first embodiment of the method of the present invention.

Referring to FIGS. 2 and 5, in the first embodiment of the present method, a buyer first specifies a requirement 100 for a product or service (collectively referred to here as a "product") that has one or more characteristics and one or more values associated with respective ones of the characteristics. (Block 14). The associated values correspond to fundamental units of measure or other features which identify the products being sought by the buyer. (Block 13). If numerical in nature, the associated values may be expressed singularly, as a range of values, as minimums, or as maximums. The criteria for expanding or narrowing the search is determined by the user, simply by designating as many or few characteristics and associated values as desired.

Once the buyer has specified a requirement for a product, a computer model 17 (FIG. 2) links the characteristics and associated values (i.e., prescriptive data) in the buyer-specified requirement to information in sources files corresponding to one or a plurality of products and/or their sellers/manufacturers.

The characteristics taxonomy model 110 is structured into four domains: Form, Fit, Function, and Administrative Data. Within each domain, characteristics are contained in a logical tree structure with linkages from the top of the domain to the lowest level of the domain, that level which contains the fundamental unit of measure or identification for the most basic characteristic identifier. The taxonomy provides the unique context for each characteristic such that its position within the taxonomy is unambiguous. Each node in the taxonomy model tree is identified with a unique index key derived from a pre-defined index key code, and is linked via the same unique index key, to a companion dictionary of terms 120, which contains definitions for all the terms included in the tree.

Referring to FIGS. 2 and 5, the system user is able to use both the characteristics taxonomy 110 and dictionary of terms 120 to assure unambiguous identification of each desired characteristic. The process begins by the user entering the required (prescriptive data) characteristic for a product into the computer model. (Block 10). With assistance from computer software the user tentatively locates the required characteristics in the characteristics taxonomy. (Block 11). Computer software assists the user in navigating the taxonomy to assure the proper context of the characteristic and by using the associated dictionary of terms to confirm the definition of the selected characteristic. (Block 12). Computer software then assists the user in identifying the fundamental unit of measure or other identification for the selected characteristic, Block 13, in order that the user can enter the desired value(s) or datum (data) applicable to that fundamental unit of measure or other identification. (Block 14).

The taxonomy model and its index key coding, thus, enable each characteristic in the buyer-specified requirement to be uniquely identified based on its node address in the tree of the taxonomy model. Preferably, the index key for each node has a prefix that represents the combination of index keys of all nodes and the domain name above that node in the taxonomy, and the unique index key for that node. The index key structure permits Boolean searches for individual node index key codes or combinations of node index key codes (i.e., desired characteristics terms) throughout the characteristics taxonomy structure without having to cite the full node index key address for the desired characteristic node.

For example, the characteristic term "compression" can be in the Form domain as a measure of the natural physical property of a material or can be in the Function domain as a measure of the functional design of a spring. A buyer seeking a spring would choose the latter characteristic "compression" in the Function domain. A buyer who might not be looking specifically for a spring might choose the characteristic "compression" in both domains. Computer software automatically records the appropriate index keys for the characteristics selected by the user. Synonym table files enable multiple nodes for the same or similar characteristic terms, to be identified and linked.

The following is a conceptual representation of a linkage in the taxonomy that applies to two characteristics associated with a box of machine screws, in accordance with the first embodiment of the present invention.

| Index Key | Characteristic | Fundamental Unit of Measure or Identification | Datum/ Value |
| --- | --- | --- | --- |
| ⁻o⁻ | FORM* | | |
| ⁻o⁻1 | Environments | | |
| ⁻o⁻1⁻6 | Packaging | | |
| ⁻o⁻1⁻6⁻2 | Unit packaging** | | |
| ⁻o⁻1⁻6⁻2⁻1 | Quantity per unit pack | NUMBER | 100 |
| ⁻o⁻1⁻6⁻2⁻2 | Unit type | CATEGORY | BOX |

*Form Domain: What the product is: its chemistry; the technology or processes to produce, inspect or classify the product; its physical properties; its content including imbedded software and material; its tests and results; how it is made, put together, handled, and processed. If naturally-occurring environmental factors cause a result (a characteristic), the characteristic is in the Form Domain. If the product creates the environment result (characteristic), the characteristic is in the Function Domain.

**Items per unit of packaging or issue; based on units of use.

The other domains of the characteristics taxonomy and their initial definitions are:

Fit Domain: The geometries and dimensional measures of a product; the physical location identifications of features of a product.

Function Domain: What a product or service does; input → output; arithmetic, logical, physics, technological. If environmental factors cause a result, the characteristic is in the Form Domain. If the product or service creates the environment result (characteristic) based on the design or the application of the product or service, the characteristic is in the Function Domain.

Administrative Data Domain: Characteristics that do not fit into one of the other domains. These characteristics include price information, source identification information, and delivery data.

In the above example, a buyer/user may consult the dictionary to determine what words are included in the taxonomy model that cover the product or service he is looking for. If the buyer/user is familiar with the dictionary terms from which the taxonomy model is constructed, he may by-pass this step. The buyer/user then specifies as a characteristic one of these dictionary terms, such as "unit packaging." This term corresponds to a node in the tree. To provide a more specific indication of the characteristic, the buyer/user may be queried as to what type of unit packaging he desires. He may then, for example, specify "unit type", after which he may be queried to enter in a fundamental unit of measure or identification information concerning this type of packaging, in response to which he may enter "category" and/or a data value of "box." (If "quantity per unit pack" is selected, he may enter "number" and "100.") The index key corresponding to "unit type" is then used to determine source pointer files, which point to one or more source electronic files in which the desired information is contained. These latter steps are described in greater detail below, and all of the steps may be performed, for example, by interactive software running on a computer.

Returning to FIGS. 2 and 5, given the buyer's requirement 100 specifying one or more characteristics and associated values for a product, a Boolean search across a plurality of products and services, and their sellers, may be simultaneously performed to provide the buyer with a larger range of choices, compared with conventional methods. This is achieved by the user transmitting the selected characteristics, fundamental units of measure or other identification, and value(s) or datum (data), with associated characteristics index key, to the System Manager which maintains the source pointer files 130. (Block 15). Source pointer files contain databases of index keys and information sources for suppliers that will provide products and services that are described by characteristics that match those index keys. The sources in the source pointer files are identified by the site locations of the data files that contain data on the offered products and services, such as a Uniform Resource Locator in Internet searches, and the necessary pointers within that site, or small application programs, for access to the required files and fields that contain the characteristics data of the offered products and services. Links to additional information are established by highlighting a selected product or service. Additional information includes multimedia displays for products and services, and capability statements or resumes for service providers. Hypertext Markup Language is one method for providing the necessary linkage to other files.

The System Manager's computer model uses index keys transmitted by the user and locates sources of offered products and services containing those index keys. (Block 16). The System Manager's computer model interrogates sources files 140 using Boolean searches to identify offered products and services that match the index keys and values entered by the user. (Block 17).

Figure 6:
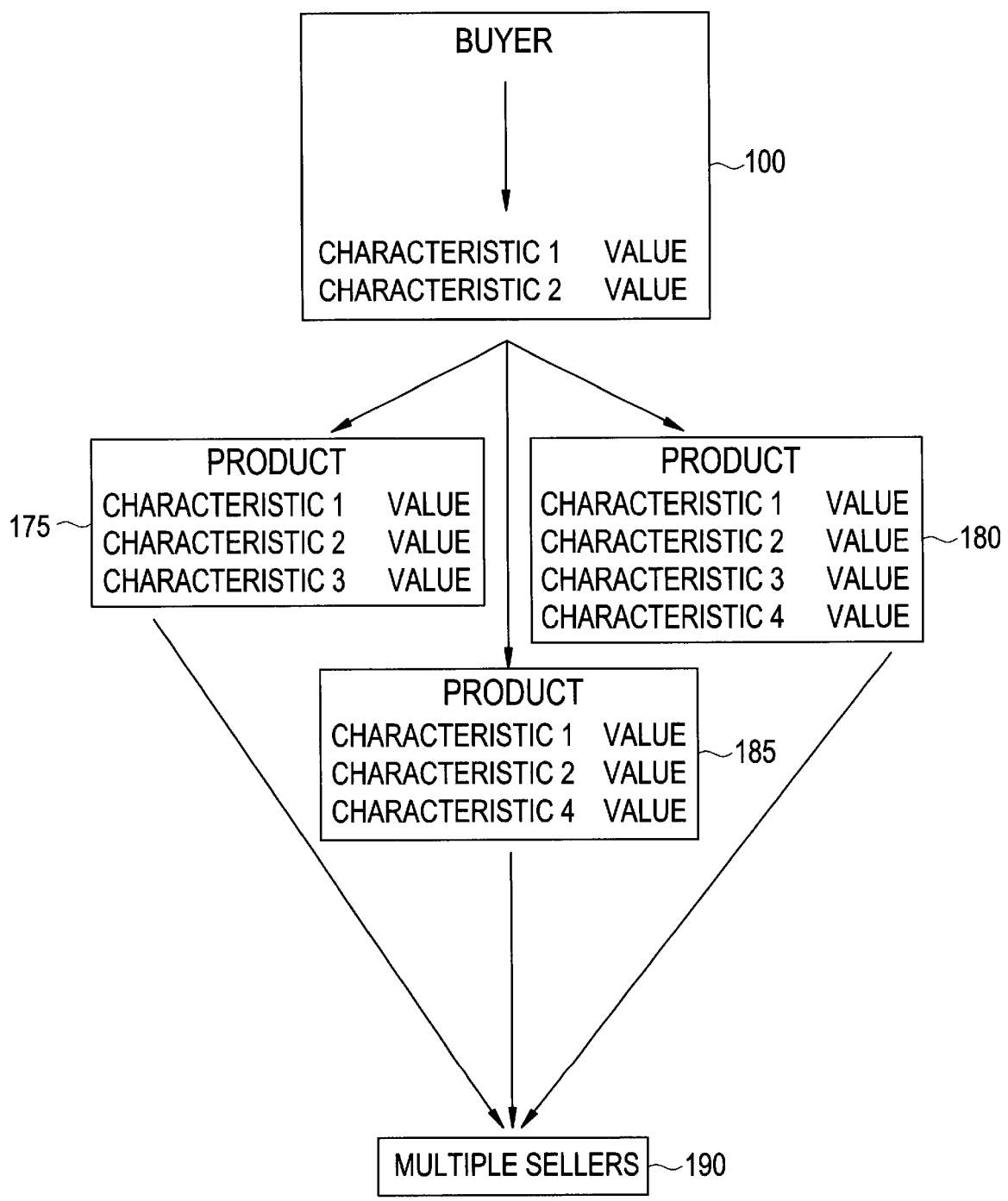
FIG. 6 is a conceptual diagram showing results obtained from the first embodiment of the method of the present invention.

A conceptual display of the results of a Boolean search is contained in FIG. 6. Based on the buyer's requirement 100, three different product types, 175, 180, and 185, are identified. Data on those products as well as their identified sellers 190 are captured by the System Manager for electronic transmission by the System Manager to the system user.

Accordingly, in FIG. 2, the next step of the method is the transmission of data on offered products and services and associated characteristics that matched the user's characteristics and values. Those data are electronically transmitted by the System Manager to the system user. (Block 18). Next, the user, electronically interacting with the System Manager, expands or reduces the displayed collection of alternatives using fewer or additional characteristics and/or less or more constrained values. (Block 19). From the displayed data, the user selects the desired product or service, or acceptable alternatives until a final selection decision is made. (Block 20). If multiple products and/or services are desired, the process is repeated for each item until the shopping list is satisfied. (Block 21). If multiple products and/or services are desired by the user, the System Manager's computer model makes final shopping list recommendations based on criteria, such as total lowest delivered price, selected by the user. (Block 22).

The user then makes the final shopping list decisions and electronically communicates those decisions to the System Manager. (Block 23). The System Manager electronically qualifies the credit limit of the user and the seller(s) through their sponsoring financial institutions. (Block 24). The feature in Block 24 enables a more dynamic process to modify credit limits that permits organizations to empower users to make buys directly for approved projects, that are not available through current methods. Buyer authorizations are based on the credit limit for each buyer (individual) registered on the system.

Upon acceptable responses from the sponsoring financial institutions, the System Manager electronically communicates buy orders and delivery instructions to sellers. (Block 25). Sellers, upon receipt of the buy orders and delivery instructions, confirm acceptance of buy orders to the System Manager. (Block 26). The System Manager then confirms the buy order(s) to the system user. (Block 27). The System Manager transmits transaction data to the user's and sellers' financial institutions for billing, debiting and crediting accounts. (Block 28) This feature enables a sharing of a payment percentage by the System Manager and sponsoring financial institutions, which is not a current practice in Electronic Commerce.

As sellers process their orders, they electronically transmit transaction status to the System Manager (Block 29). The System Manager then electronically communicates the transaction status data to the system user. (Block 30).

Relating index keys to nodes in the taxonomy model is advantageous for identification of descriptive data files for products and services. The index key in descriptive data files can be in the form of a name of a file containing values for that characteristic and the associated product or service to which each value applies, a field name containing values for that characteristic and linked to the associated product or service, a column header with functions similar to a field name, a content tag associated with a product or service and a value for that characteristic, or a pointer with functions similar to a content tag.

Further, as previously noted, using the index keys, the taxonomy model maps the characteristics and associated values in the buyer-specified requirement to one or more source pointer files. To be accurate, the characteristics specified must not in any way be ambiguous. This could otherwise happen, for example, in the case where a characteristic measure is the word "second" which can be a measure of time or a measure of arc. Further, arc in a different context can be measured in yards, meters, or other units of measure. It is therefore imperative that all ambiguity be removed from the characteristics used in the buyer-specified requirement.

The ambiguity of each characteristic in the buyer-specified requirement is eliminated by, one, using the dictionary of characteristics terms, selecting the proper context of the characteristic within the taxonomy, and then using only terms in the dictionary and taxonomy in the buyer-specified requirement to communicate the characteristics of the product or service about which the buyer would like to obtain information, i.e., specifying the prescriptive data using only words found in the dictionary and taxonomy.

The method of the present invention outperforms conventional methods for conducting electronic commerce in a variety of ways. First, through the use of its taxonomy model, companion dictionary, and index key codes, the method of the present invention simultaneously searches for a plurality of products and services. Further, as shown in FIG. 6, alternative product types may be obtained from the search, which none of the conventional methods produce. For example, a search for coasters to be placed under the legs of a table might result in a set of characteristics and values that produce alternative products such as ash trays, that might have not been considered, and at a lower price or more timely delivery.

Second, by searching for characteristics and associated values for products and services, rather than for the products or sellers themselves, the present method is able to locate a larger array of information on products and services than conventional methods. This feature of the invention also enables product/service information to be obtained without requiring buyers to have a complete foreknowledge of the various products/services being offered on the market. Rather, buyers need only enter prescriptive characteristics of products/services into the taxonomy model, along with associated values and other identifying features, and the method of the present invention will output a list of products and services meeting that need, including alternative or unorthodox products or services which might not traditionally be considered for fulfilling that need, e.g., use of an ash tray as a coaster.

Third, the method of the present invention is sufficiently adaptable to provide a buyer with information concerning the lowest prices available for a particular product or service of interest, even in circumstances where sellers are not pushing those products.

Still other advantages are apparent. For example, by specifying values with characteristics, buyers may obtain through the present invention information regarding differently packaged products, which eliminates confusion surrounding same products with different storekeeping units (SKUs) given for different packaging schemes. Other information such as delivery time and total cost is also attainable through use of the present method.

Also, the present invention will obviate the need, for a data architecture such as that developed in U.S. Pat. No. 5,675,784, so that multiple products that satisfy prescriptive requirements can be identified and displayed.

The databases containing the characteristics taxonomy and the dictionary of terms are designed to be dynamic. Products, services, characteristics, terms given to characteristics, characteristics measures and identifiers, and common usage of terms change over time. The system and methods in this invention are sufficiently flexible to accommodate change without destroying the unambiguous identification of characteristics that the invention provides. All modifications to the taxonomy, dictionary or coding structure are made in a way that preserves the integrity of earlier versions of files established to effect the system and methods of the invention.

The present invention enables the reengineeering of how procurement is effected for individual buyers as well as organizational entities. Procurements can be readily effected by users of products and services without the need for participation of specialized procurement personnel.

Opportunities are provided for buyer-to-buyer transactions where non-traditional sources can make products or services visible to the system. This "flea market" capability allows non-warranty commerce in products and services that are otherwise treated as wasted or wasting resources. Examples include odd-lot products such as remainders of a box of screws when the production job calling for those screws is completed, or when computer equipment is replaced by later technology.

Current electronic commerce systems establish a strategic business relationship with the seller as a revenue source for the System Manager. The present invention enables a strategic relationship between the System Manager and the buyers of products and services. Current systems focus on marketing, advertising and traditional sales approaches used by sellers. The present invention promotes effectiveness in sourcing by buyers where the buyers have the automated decision support tools to implement selection criteria such as price, reliability or delivery schedule. Control over presented data is in the hands of the buyer. No seller has exclusive rights to visibility by a buyer. The buyer accepts or avoids sellers' efforts at marketing, promotions, advertising or traditional sales approaches, based on the buyer's wants or needs. The buyer is presented with more perfect information that is not limited to what the seller wants the buyer to see. For example, if a seller withholds information that a buyer considers crucial in an acquisition decision, the product or service offered by that seller becomes invisible to the buyer (i.e., it is bypassed in the Boolean characteristics search).

The present invention lends itself to speech recognition for increased efficiency in commerce in products and services.

The present invention also permits improved capture of design intent (i.e., prescriptive data) in bills of material. As noted in Turner et al., *Introduction to Industrial and Systems Engineering*, p. 50, 1987: "A bill of material is a list of parts needed to make an assembled product. The number and name of all parts are shown with the source of each part (purchase or manufacture) and the number and name of the completed product."

Whereas current methods of identifying products in bills of material are limited to descriptive data such as product name, part number and product source for the product selected for inclusion in the end product, the unique characteristic identification system of this invention enables unambiguous capture of the prescriptive characteristics and values for each physical configuration item location in an end-product design. Those data can then be used as entry arguments in future product sourcing, rather than limiting the sourcing to identical parts, as is the current method, or committing resources to the reverse engineering needed for sourcing alternative products. The ability to capture characteristics index keys and characteristics values in automated and manual systems that produce bills of material enables efficient applications of the characteristic taxonomy in documenting design intent.

Figure 3:
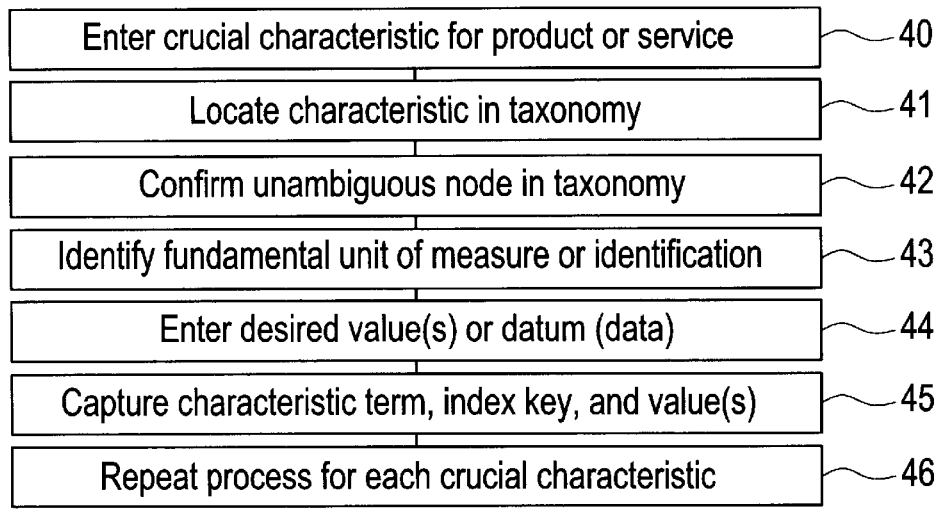
FIG. 3 is a flow diagram showing steps included in a second embodiment of the method of the present invention.

A second embodiment of the method of the present invention is provided to correct deficiencies in the bill of material process. Steps in the embodiment applicable to computer aided design systems or bills of material to capture prescriptive data and design intent that may be used at a future date for locating products or services associated with an end-product being designed are shown in FIG. 3. Many of the steps in FIG. 3 are common to those of Internet Commerce shown in FIG. 2, except that interaction with the System Manager is not required.

As in the first embodiment, the first step in the second embodiment of the present invention is the user's identification of a crucial characteristic of a product or service included in an end-product design. (Block 40). For example, the user enters "resistance" for a resistor to be used in a circuit card. The user next locates the required characteristic in the characteristics taxonomy with assistance from installed computer software. (Block 41). The user confirms the unambiguous node in the computer taxonomy model for the required characteristic by navigating the taxonomy and using the associated dictionary of terms. (Block 42). Assisted by computer software, the user identifies the fundamental unit of measure or identification at the lowest level of the taxonomy applicable to the identified characteristic. (Block 43). The user then highlights the selected characteristic and enters the appropriate value(s) or datum (data) applicable to the fundamental unit of measure or identification for that characteristic for the required product or service. (Block 44). The CAD system or bill of material software captures the characteristic term, the characteristic index key, and the entered value(s) or datum (data) applicable to the characteristic. (Block 45). The process is repeated for each crucial characteristic applicable to each product or service included within the end-product design. (Block 46).

Figure 4:
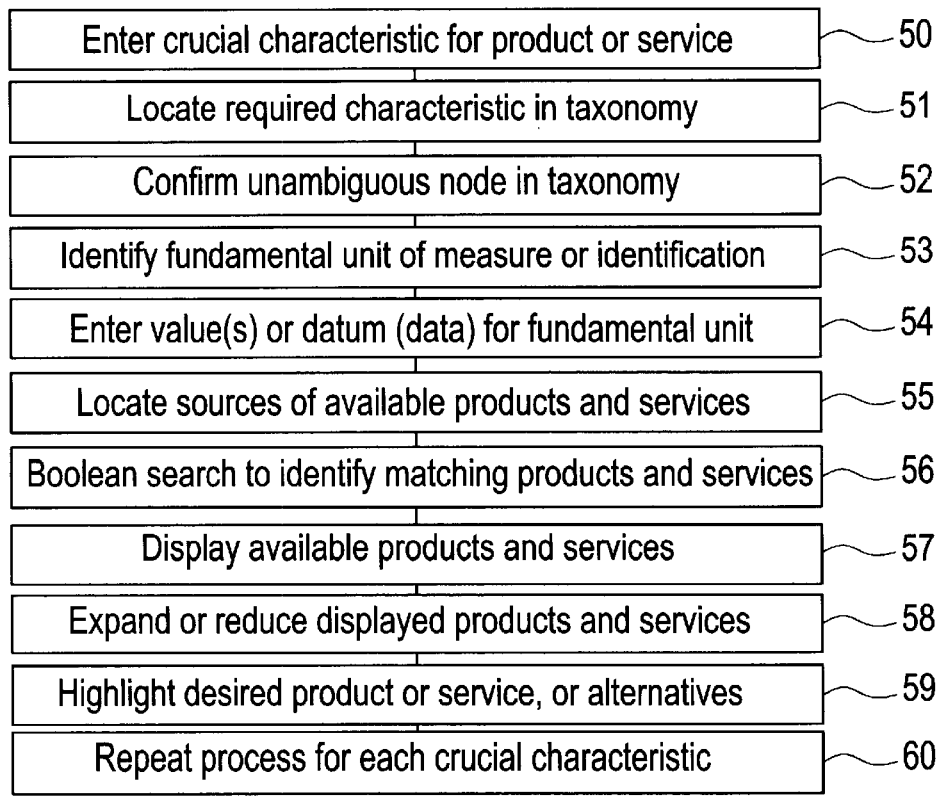
FIG. 4 is a flow diagram showing steps included in a third embodiment of the method of the present invention.

A third embodiment of the method of the present invention is provided to assist users in locating products in local inventory or services within local capability, but not requiring interaction with the System Manager. Steps in that method are shown in FIG. 4, many of which are common to those of Internet Commerce shown in FIG. 2.

As in the first embodiment, the first step in the third embodiment of the present invention is the user's identification of a crucial characteristic of a product or service included in an end-product design. (Block 50). For example, the user enters "resistance" for a resistor to be used in a circuit card. The user next locates the required characteristic in the characteristics taxonomy with assistance from installed computer software. (Block 51). The user confirms the unambiguous node in the computer taxonomy model for the required characteristic by navigating the taxonomy and using the associated dictionary of terms. (Block 52). Assisted by computer software, the user identifies the fundamental unit of measure or identification at the lowest level of the taxonomy applicable to the identified characteristic. (Block 53). The user then highlights the selected characteristic and enters the appropriate value(s) or datum (data) applicable to the fundamental unit of measure or identification for that characteristic for the required product or service. (Block 54). Computer software model uses the index key corresponding to the selected characteristic and locates sources of available products and services containing that index key using local electronic source pointer files. (Block 55). This is the same sourcing process as 130 in FIG. 5, except that the source pointer files and source files are local, and are not maintained by the System Manager as in Internet Commerce. A computer software model interrogates local sources files using Boolean searches to identify available products and services that match the index keys and values entered by the user. (Block 56). A computer software model displays available products and services and associated characteristics that matched the characteristics and values entered by the user. (Block 57). The user, electronically interacting with the computer software model, expands or reduces the displayed collection of alternatives using fewer or additional characteristics and/or less or more constrained values. (Block 58). The user highlights the desired product or service, or acceptable alternatives, until a final selection decision is made. (Block 59). Finally, the process is repeated for each crucial characteristic applicable to each product or service desired. (Block 60).

Each of the foregoing embodiments of the present method is described with the understanding that the steps therein, except for making the search statement comprised of the characteristic term and value for the fundamental unit of measure or identification, may be automatically performed by a computer, such as a personal computer equipped with application software containing communications software and interface programs for appropriately interfacing to the Internet for conducting searches for source files therein.

Other modifications and variations to the invention will be apparent to those skilled in the art from the foregoing disclosure. Thus, while only certain embodiments of the invention have been specifically described herein, it will be apparent that numerous modifications may be made thereto without departing from the spirit and scope of the invention.

What is claimed is:

1. A computer-implemented method for conducting electronic commerce between buyers and sellers of at least one of a plurality of products and services, information of said products and services being stored in at least one electronic file accessible through a network, said computer method comprising:

defining a taxonomy model by:
   (a) forming a logical tree for each of four domains of said taxonomy model, said trees being formed from a plurality of terms within said domains, each of said terms being indicative of a characteristic of a product or service,
   (b) storing a plurality of source pointers in electronic form, each of said plurality of source pointers linking a respective one of a plurality of source files, each of said plurality of source files containing information about at least one of a product or service and a seller/manufacturer of a product or service, and
   (c) developing an index key code containing a plurality of index keys each linking one of said plurality of terms to at least one of said plurality of source pointers, specifying a prescriptive term indicative of a characteristic of a product or service of interest to said buyer, said prescriptive term being included within at least one of said domains;

performing a computer word search to compare said prescriptive term to said taxonomy model in accordance with steps which include:
   (1) locating said prescriptive term within the logical trees to determine an index key associated with said prescriptive term,
   (2) determining at least one source pointer within said plurality of source pointers which corresponds to said index key, and
   (3) locating a source file which links to said at least one source pointer determined in step (2), and outputting information from the source file which links to said at least one source pointer as information which matches the product or service of interest.

2. A computer-implemented method for capturing design intent for products and services included in the design of an end-product, comprising:

defining a logical tree structure relating a plurality of terms in a predetermined manner, each of said terms indicative of a characteristic of a product or service;

forming an index key code containing a plurality of index keys each linking one of said plurality of terms to a fundamental unit of measure or identification;

forming a dictionary of terms, each keyed to a term in the logical tree;

performing a computer word search based on a cited characteristic of a product or service; and capturing data which includes said cited characteristic and a corresponding index key, fundamental unit of measure or identification, and a value or datum applicable to said fundamental unit of measure or identification, for said cited characteristic of each product or service in said end-product design.

3. A computer-implemented method for locating products in local inventory or services with local capability for at least one of a plurality of products and services, information of said products and services being stored in at least one electronic file accessible through a computer system or network, said computer method comprising:

defining a taxonomy model by:
   (a) forming a logical tree for each of four domains of said taxonomy, said trees being formed from a plurality of terms within said domains, each of said terms being indicative of a characteristic of a product or service,
   (b) storing a plurality of source pointers in electronic form, each of said plurality of source pointers linking a respective one of a plurality of source files, each of said plurality of source files containing information about at least one of a product or service and a seller/manufacturer of a product or service, and
   (c) developing an index key code containing a plurality of index keys each linking one of said plurality of prescriptive terms to at least one of said plurality of source pointers, specifying a prescriptive term indicative of a characteristic of a product or service of interest to said buyer, said prescriptive term being included within said domains;

performing a computer word search to compare said prescriptive term to said taxonomy in accordance with steps which include:
   (1) locating said prescriptive term within the logical trees to determine an index key associated with said prescriptive term,
   (2) determining at least one source pointer within said plurality of source pointers which correspond to said index key, and
   (3) locating a source file which links to said at least one source pointer determined in step (2), and outputting information from,the at least one source file which links to said at least one source pointer as information which matches the product or service of interest.

4. The method of claim 1, further comprising:

specifying N prescriptive terms where N is greater than 1, each of said N prescriptive terms being indicative of a respective characteristic of said product or service of interest;

comparing said N prescriptive terms to said taxonomy model in accordance with steps (1)–(3) to locate source files corresponding to said N prescriptive terms;

specifying a boolean search statement defining a desired relationship among said N prescriptive terms;

conducting a search of said source files based on said Boolean search statement;

identifying one or more of said source files satisfying said Boolean search statement; and outputting information from said one or more source files which match the product or service of interest.

5. The method of claim 1, wherein said specifying step includes specifying at least one value associated with said characteristic, said at least one value corresponding to one of a fundamental unit of measure and an identifying feature of the product or service of interest, and wherein said method further includes:

searching source files corresponding to said at least one source pointer file based on said at least one value associated with said characteristic, said source file located in step (3) being a source file which satisfies said at least one value associated with said characteristic.

6. The method of claim 1, wherein said four domains correspond, respectively, to form, fit, function, and administrative data.

7. The method of claim 1, further comprising:

providing a dictionary containing terms indicative of characteristics of products or services including said plurality of prescriptive terms and their definitions; and using said dictionary to select or confirm a meaning of said prescriptive term specified in said specifying step.

8. The method of claim 1, further comprising:

communicating a request to purchase a product or service described in the source file from a buyer at a user terminal to central computer system;

electronically qualified a credit limit of said buyer and a seller of said requested product or service with financial institutions of said buyer and seller;

communicating, upon approval from said financial institutions, a purchase directive from said central computer system to a terminal of the seller;

transmitting transaction data to the financial institutions of the buyer and seller for billing, debiting, and crediting accounts; and transmitting status information to the buyer at said user terminal to confirm receipt of said purchase order by said seller.

9. The method of claim 8, wherein said step of selling transaction data includes:

sharing of a payment percentage by said central computer system and said financial institutions.

10. The method of claim 1, wherein said specifying step is performed in accordance with speech recognition software.

* * * * *